Aug. 20, 1940.  F. A. ANETSBERGER  2,212,001
PROOF BOX CONSTRUCTION
Filed Sept. 27, 1937
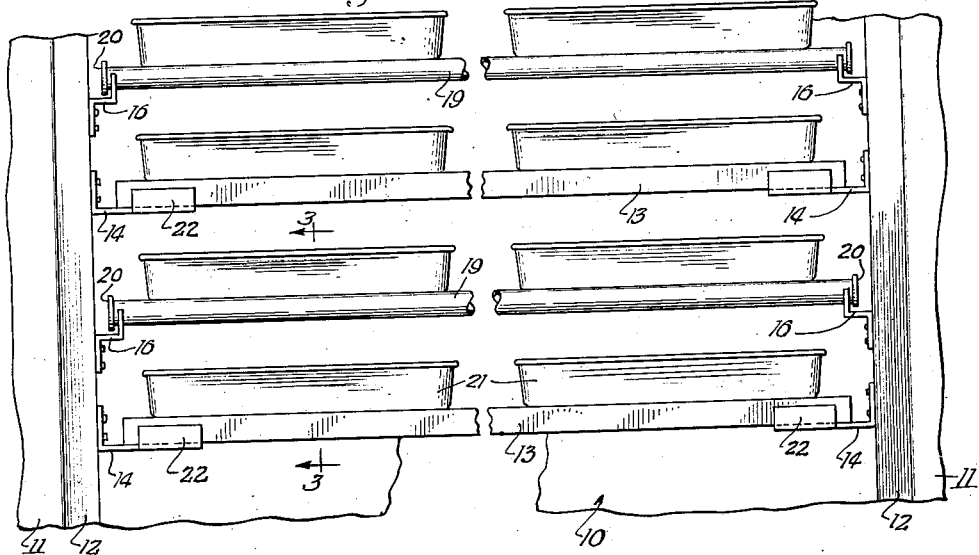
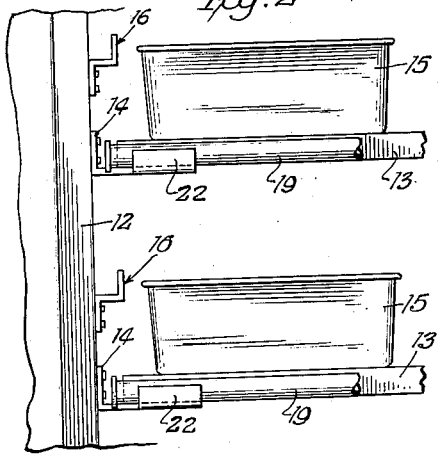
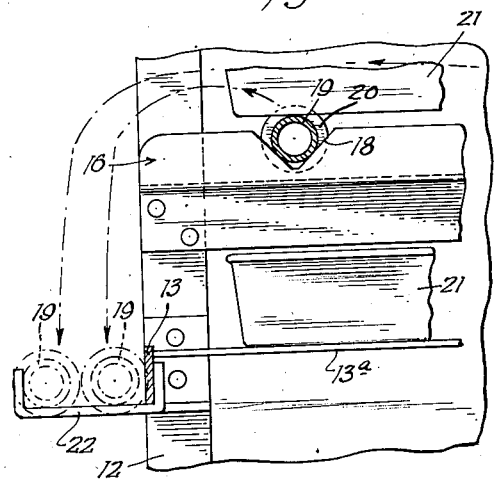
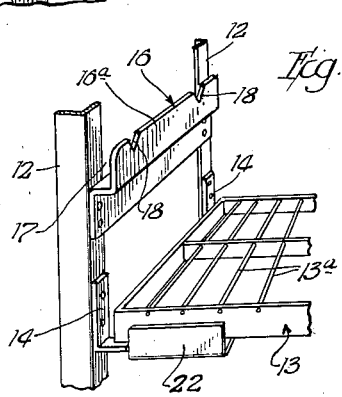
Inventor
Frank A. Anetsberger
By Sheridan, Davis and Cargill
Attys.

Patented Aug. 20, 1940

2,212,001

UNITED STATES PATENT OFFICE 2,212,001

PROOF BOX CONSTRUCTION

Frank A. Anetsberger, Chicago, Ill.

Application September 27, 1937, Serial No. 165,938

3 Claims. (Cl. 211—134)

This invention relates to improvements in proof box construction and particularly to shelving therefor. Proof boxes of the type provided with shelves upon which pans of bread dough are placed during the proofing thereof frequently do not afford the proofing capacity required when used in the proofing of other bakery products such as rolls, buns or the like which require less time in baking. It is not unusual, therefore, for a baker to have a proof box of a capacity that will proof bread dough in substantially the quantity that will enable him to keep the oven in operation at its maximum or most economical rate but in baking certain other products as rolls, buns, or the like, which require less time in the oven than bread, such proofing capacity of the box is less than the baking capacity of the oven and hence less economical operation of the oven is possible in baking such products or additional proof box capacity must be provided which may not be required except under the particular circumstances mentioned.

It is an object of the present invention to provide a proof box having supplemental shelving which may be utilized for increasing the capacity of the box when such is required in proofing products requiring less space vertically of the box but which may be displaced to a position affording the normal vertical space between the stationary or conventional shelving when desired. It will, therefore, be seen that in a particular bakery a proof box of the improved type may be employed of such bread proofing capacity as may be necessary in correlating the proofing operations with the baking capacity of the oven and by means of the supplemental shelving so increase the proofing capacity of the box with respect to certain other more quickly baked products that the oven may likewise be operated economically during the baking of such other products.

In the accompanying drawing illustrating an embodiment of the invention:

Fig. 1 is a broken front elevation of a proof box showing conventional shelving and supplemental shelving in position therein;

Fig. 2 is a broken front elevation of a proof box of the improved type showing the supplemental shelving moved to a position in the horizontal plane of the conventional shelving;

Fig. 3 is a sectional view taken on line 3—3 of Fig. 1 and illustrating the conventional and supplemental shelving in position and indicating, by dotted lines, the disposition of the supplemental shelf members in the horizontal plane of a subjacent conventional shelf; and Fig. 4 is a broken perspective view of a portion of the shelving supporting frame and shelving and shelf supports.

In the drawing, 10 indicates generally a proof box which at one side or end may be provided with a pair of sliding doors 11 of any approved construction which, when open, provide access to the interior of the box. As is well known, proof boxes are used generally for supplying heat and moisture to the contents of the box during the proofing operation. Such means are not shown herewith nor is the construction of the box itself pertinent to the present improvements.

Within the box 10 shelf supporting frame work is provided such, for example, as the corner uprights 12 which may be of angle or channel iron. Secured to the members 12 of the supporting frame disposed within the box are shelves 13 which may be of conventional construction and in the form illustrated in Fig. 4 are provided with metal frames which support transverse rods 13a upon which pans of dough are placed during the proofing operation. The shelves 13 may be supported in suitably spaced relation by any approved means such as the L-shaped clips or brackets 14 which are secured to the uprights 12. The space between adjacent shelves 13 is, of course, such as to accommodate the pans of dough to be supported by the shelves. Since bread pans generally require the maximum spacing between such shelves they may be, for example, spaced about six inches or more apart. Such bread pans 15 are illustrated in position on such shelves in Fig. 2.

It will be seen, therefore, that where the proofing capacity of the box is limited to the shelving space provided by the shelves 13 and such capacity is adequate to enable the oven to be operated economically in baking bread only, the capacity of the box may be insufficient to accommodate the proper proofing in sufficient quantity of products such as buns or rolls, coffee cakes, or the like, which require a shorter time in baking but little or no less time in proofing. By providing supplemental shelves for such products, the proofing capacity of the box may be increased since such products generally require less space vertically within the box.

For increasing the proofing capacity of the box for such bakery products that require less vertical space, a pair of supplemental shelf supports 16 are provided between adjacent shelves 13. The supplemental shelf supports 16 may be secured to each pair of front and rear frame members 12 as shown in Fig. 4 and each comprising a vertical flange member 16a offset inwardly from the adjacent surfaces of the members 12 to provide a space or channel 17 therebetween for the purpose to be referred to hereinafter. The flanges 16a are provided with two or more notches or depressions 18 for supporting the ends of supplemental shelf members 19 which preferably are of tubular form. The members 19, as shown in Figs. 1, 2 and 3, are provided with annular flanges 20 at their ends, which ends are disposed in the spaces or channels 17 above mentioned. The members 19 are arranged to seat in a notch 18 of each of a pair of supporting members 16 as shown. The members 19 supported on each pair of members 16 provide supplemental shelves between the adjacent shelves 13. With such arrangement, shallower pans 21 for holding buns, rolls and so forth can be placed upon all the shelves or, if desired, upon some of the shelves during the proofing operation. The arrangement in fact doubles the proofing capacity of the box.

In removing the supplemental shelf members 19 from the position shown in Fig. 1, they are merely lifted from or rolled out of the respective notches 18 and forwardly of the box and dropped or placed upon supporting brackets 22 attached to the shelf members 13 as by welding or riveting. The members 22 of each shelf 13 are arranged to support the supplemental shelving members 19 which are used on the superjacent pair of supporting members 16 and support such members in substantially the horizontal plane of the shelves so as to provide no obstruction to the free sliding on or out of the pans 15. The members 22 are disposed sufficiently inwardly of the box so as not to interfere with the free closing or opening of the door or doors 11.

In restoring the supplemental shelf members 19 from the position shown in dotted lines in Fig. 3 to the full line position, one of such members 19 is lifted and placed upon its supporting members 16 and pushed rearwardly of the box past the forward notches 18 and thence pushed or rolled further rearwardly until the member 19 is then placed in its pair of supporting notches. The flanges 20 of the members 19 prevent longitudinal displacement of the latter from their supporting members but, due to the fact that the channels or spaces 17 are open at their forward ends, the members 19 can be rolled or slid freely from the member 16. With the supplemental shelf members in position as shown in Fig. 1, adequate vertical space is available for the shallower pans 21. It will be seen that it is unnecessary actually to remove the supplemental shelving from the box during the alteration for increasing or decreasing the pan-holding capacity of the box and that with the present improvements, a single proof box may be utilized in a bakery where now two boxes are used or where the proofing operation is not correlated to the best advantage with the baking operation.

In the above description of the invention, the supporting frame comprising the posts 12 and shelves 13 are referred to as portions of a proof box. It is well known that in large bakeries proof boxes or proof chambers of large capacity are employed into which racks, provided with casters and comprising supporting shelves for the pans, are wheeled. Such racks which are well known are usually of suitably braced simple angle iron construction generally similar to the frame and shelf construction shown in Fig. 4. It will be obvious, therefore, that such racks may be provided with the improved supplemental shelf members 19 and the supporting brackets 22 for performing the same desirable functions performed by the present improvements when employed in smaller proof boxes having a stationary or built-in shelf supporting frame as described above.

While I have shown and described an embodiment of the improvements for the purpose of illustration, it will be seen that various changes in detail of construction may be resorted to without departing from the spirit of the invention.

I claim:

1. An article of the class described comprising a supporting frame, a plurality of vertically spaced shelves supported thereby, supports for supplementary shelf members supported by said frame members and disposed between pairs of said vertically spaced shelves, said supports each comprising flanges spaced inwardly of the supporting frame and provided with horizontally spaced notches, and a plurality of supplementary shelf members each adapted to seat in a pair of said notches and provided with end flanges disposed between the flanges of said supports and the adjacent portions of said frame whereby said members are retained against longitudinal displacement but are removable from said supports in the direction of the length of the latter.

2. In a proof box construction, a shelf supporting frame, a plurality of vertically spaced shelves supported by said frame, pairs of horizontal supports disposed between adjacent pairs of said shelves and secured to said frames, each pair of said supports being provided with notched upstanding flanges spaced inwardly of the adjacent portions of said frame, removable supplementary shelf members each arranged to seat in a pair of said notches and provided with end flanges for resisting longitudinal displacement of the members from the respective supports but arranged for forward and rearward movement within the respective spaces between said flanges and the adjacent portions of said frame, and forwardly extending members carried by said shelves for supporting the superjacent supplementary shelf members in the plane of said shelf upon removal of the latter from the respective supports.

3. A pan supporting structure comprising a frame, a pair of vertically spaced shelves supported by said frame, a pair of cooperating horizontal supports between said shelves and each provided with a plurality of recesses, independently movable shelf-forming members each adapted to be supported at the ends thereof by said supports and to seat in and be spaced relatively horizontally by the recesses of said supports to provide a removable shelf between said pair of shelves, and forwardly projecting brackets adjacent the forward edge of the lower of said pair of shelves for supporting said shelf-forming members in alignment with said lower shelf when said shelf-forming members have been removed from said shelves.

FRANK A. ANETSBERGER.